United States Patent
Fuller

(10) Patent No.: US 6,662,822 B2
(45) Date of Patent: Dec. 16, 2003

(54) ONE-WAY NUT FASTENER

(75) Inventor: Christopher Fuller, Thompsons Station, TN (US)

(73) Assignee: Apcom, Inc., Franklin, TN (US)

( * ) Notice: Subject to any disclaimer, the term of this patent is extended or adjusted under 35 U.S.C. 154(b) by 154 days.

(21) Appl. No.: 09/988,080

(22) Filed: Nov. 16, 2001

(65) Prior Publication Data

US 2003/0094200 A1 May 22, 2003

(51) Int. Cl.$^7$ ............................................. F16K 35/00
(52) U.S. Cl. .................... 137/383; 137/327; 137/382.5; 411/190
(58) Field of Search ........................... 137/327, 377, 137/382, 382.5, 383; 411/190

(56) References Cited

U.S. PATENT DOCUMENTS

| | | | |
|---|---|---|---|
| 283,021 A | 8/1883 | Raggio | |
| 1,305,539 A | 6/1919 | Hale | |
| 1,428,745 A | 9/1922 | Bayles | |
| 2,583,869 A | 1/1952 | Monson | |
| 2,652,225 A | 9/1953 | Peterson et al. | |
| 2,964,290 A | 12/1960 | Mueller | |
| 3,552,427 A * | 1/1971 | Jacobson | 137/382 |
| 3,760,836 A | 9/1973 | Albanese | |
| 4,182,361 A * | 1/1980 | Oakey | 137/296 |
| 4,762,144 A * | 8/1988 | Ford | 137/382.5 |
| 4,911,198 A | 3/1990 | Kerin, Jr. | |
| 5,039,062 A | 8/1991 | England et al. | |
| 5,236,634 A * | 8/1993 | Hammett et al. | 261/71 |
| 5,322,645 A * | 6/1994 | Hammett et al. | 261/71 |
| 5,513,831 A | 5/1996 | Seward | |
| 5,630,965 A * | 5/1997 | Shaw et al. | 261/71 |
| 6,152,165 A | 11/2000 | Fukuda | |
| 6,170,799 B1 | 1/2001 | Nelson | |
| 6,179,223 B1 | 1/2001 | Sherman et al. | |
| 6,543,467 B2 * | 4/2003 | Robinson | 137/15.01 |

* cited by examiner

Primary Examiner—A. Michael Chambers
(74) Attorney, Agent, or Firm—Michael Best & Friedrich LLP

(57) ABSTRACT

A novel, one-way nut fastener including a nut body with a side wall that is internally threaded and lobes that extend from the side wall of the nut body. Each lobe has a flat portion that extends substantially radially away from the side wall and a curved portion that extends from the flat portion to the flat portion of an adjacent lobe. A special tool uses the leverage that is gained from the flat portions of the lobes to tighten the cap threads onto the threads of a stem portion. Since the leverage gained from the lobes, which is used to tighten the nut fastener, cannot be used to loosen the fastener, it is much more difficult to remove the nut fastener.

4 Claims, 3 Drawing Sheets

ONE-WAY NUT FASTENER

FIELD OF THE INVENTION

The present invention generally relates to a nut fastener that can be driven in only one direction.

BACKGROUND OF THE INVENTION

Existing nut fasteners can be either tightened or loosened by a user. A problem with the two-way fasteners is that a person may tamper with the fastener or remove the fastener without permission. For example, if the fastener is used to seal a fluid or gas and a person, such as a child, accidentally loosens the nut fastener, the fluid or gas will be unintentionally released, creating an unsafe situation.

SUMMARY OF THE INVENTION

This invention is a novel, one-way nut fastener. The nut fastener includes a nut body with a side wall that is internally threaded and lobes that extend from the side wall of the nut body. Each lobe has a flat portion that extends substantially radially away from the side wall and a curved portion that extends from each flat portion to the flat portion of an adjacent lobe.

A special tool uses the leverage that is gained from the flat portions of the lobes to tighten the cap threads onto the threads of a stem portion. Since the leverage gained from the lobes, which is used to tighten the nut fastener, cannot be used to loosen the fastener, it is much more difficult to remove the nut fastener.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE INVENTION

The preferred embodiment of the invention will be explained in further detail by making reference to the accompanying drawings, which do not limit the scope of the invention in any way.

Figure 1:
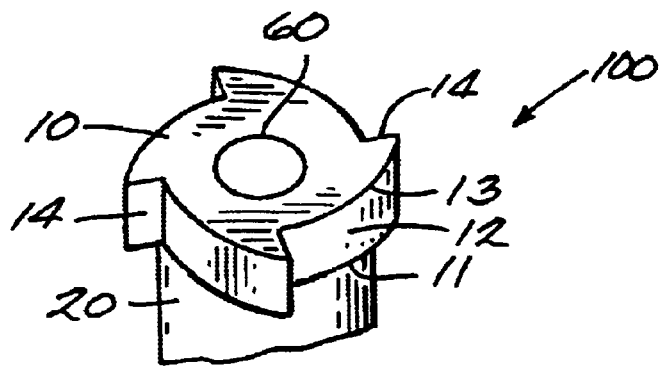
FIG. 1 is a three dimensional view of the nut fastener.
Figure 2:
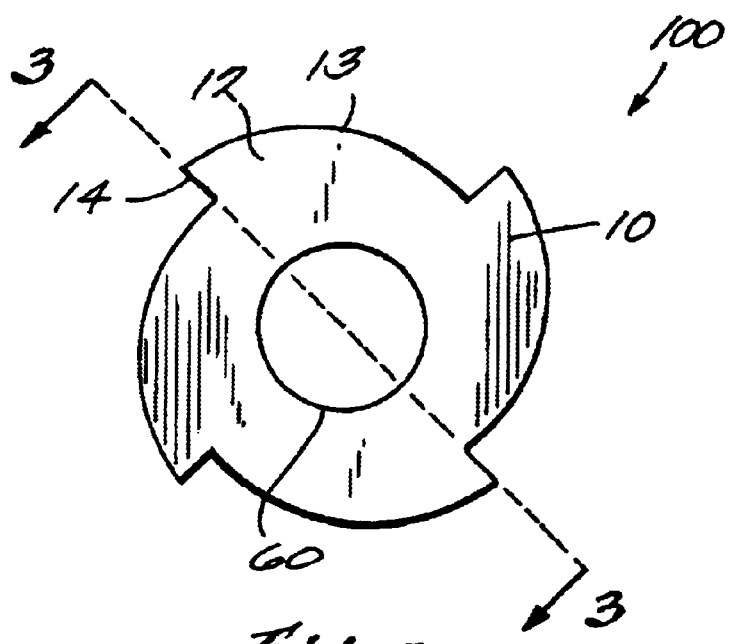
FIG. 2 shows the top of the nut fastener.
Figure 3:
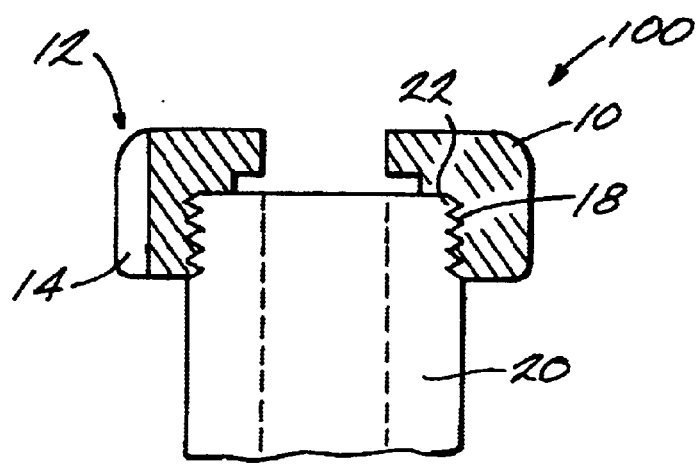
FIG. 3 is a 3—3 cross-sectional drawing showing the mating of the threads of the fastener and stem portion.

Referring to FIGS. 1–3, the invention relates to a novel, one-way nut fastener 100. The fastener includes a nut body 10 including a side wall 11 and a plurality of lobes 12 that extend from the side wall 11 of the nut. Each of these lobes 12 has a flat portion 14 that extends radially away from the side wall of the nut body 10 and a curved portion 13 that extends from the flat portion 14 of each lobe 12 to the flat portion 14 of an adjacent lobe 12. The inside surface of the side wall is threaded in a conventional manner.

A special tool, that has a socket with the same shape as the lobed nut body 10, uses the leverage that is gained from the flat portion 14 of the lobes 12 to tighten the nut body 10 onto a mating portion 20 having external threads 22. As the nut body 10 is turned, the threads 18 of the nut body 10 mate with the threads 22 of the stem portion 20. Since the leverage gained from the lobes 12 cannot be used when turning the nut body 10 the other direction to loosen the fastener 100 (because the point of force is on the curved portion 13), a person will be unable to apply the force required to remove the nut body 10.

Figure 4:
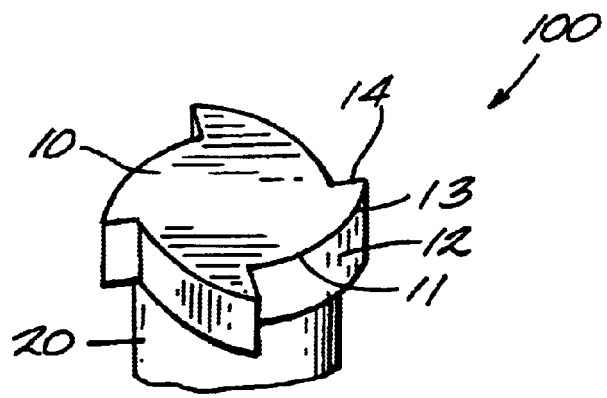
FIG. 4 is a three dimensional view of the nut fastener use with a water heater drain valve.

The invention can be used as a nut cap, as is shown in FIG. 4, or as a conventional nut.

Figure 5:
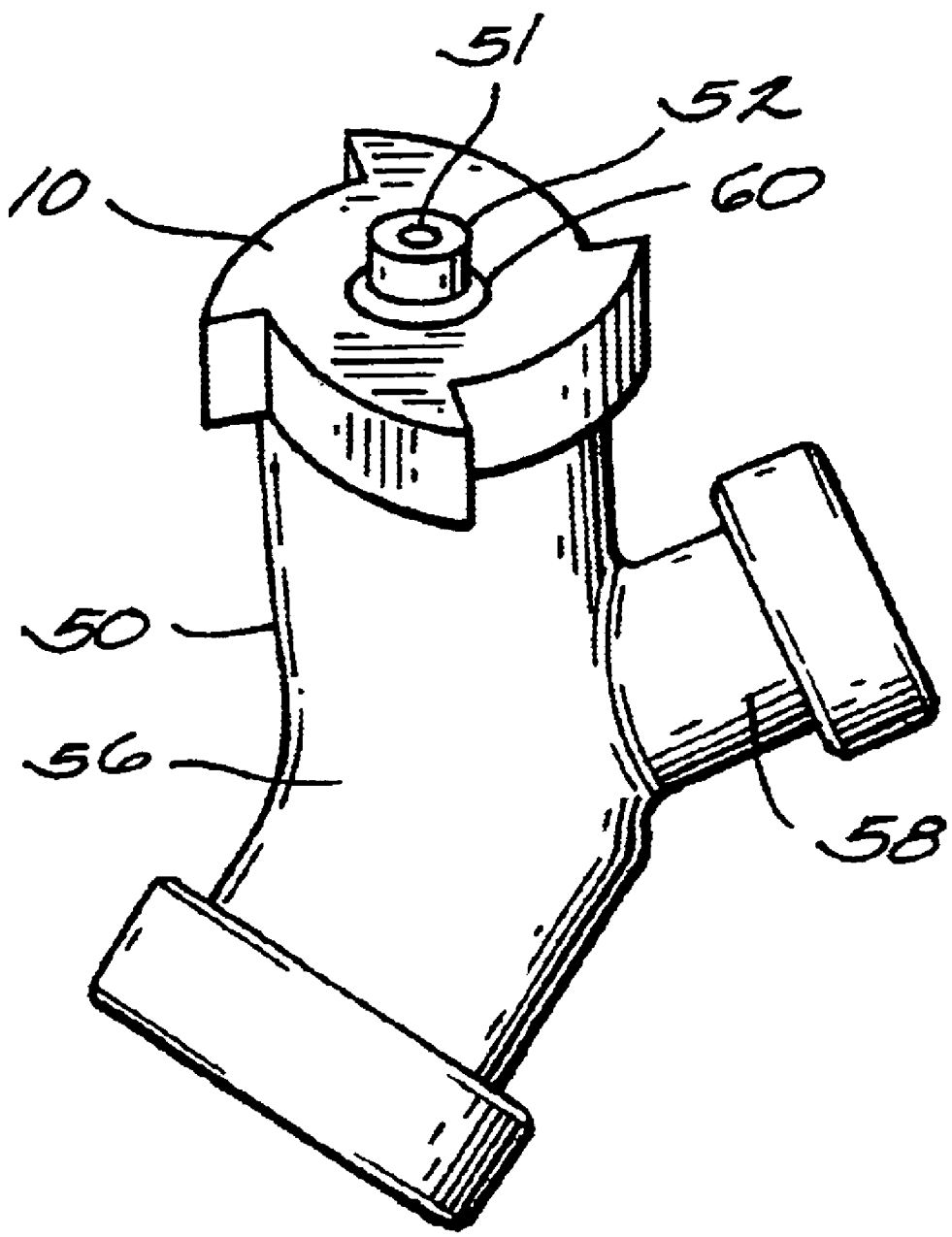
FIG. 5 is a perspective view of one envisioned embodiment of the present invention.

As shown in FIG. 5, one envisioned embodiment of this invention is as a valve cap for a child resistant water heater drain valve. The valve 50 includes a valve stem 52 having a slot 51, an upstream portion 56, and downstream portions 58. The valve stem 52 extends through a through hole 60 in the nut body 10 and can be rotated by inserting a straight screw driver into the slot 51. The nut body 10 is used to secure the valve stem 52 to the valve 50.

Once the nut body 10 is tightened, a child would not be able to loosen it. Similarly, an adult would not be able to inadvertently loosen the nut body 10 when they actually intend to reduce or increase the flow of hot water through the valve 50 by turning the valve stem 52. This prevents the accidental release of hot water.

In this embodiment, the nut fastener 100 is made of a glass fill heat stabilized polypropylene, but this is not essential to the invention. The embodiment of the invention is shown with four lobes 12, but the invention is not limited by this number.

It is of course understood that departures can be made from the preferred embodiment of the invention by those of ordinary skill in the art without departing from the spirit and scope of the invention that is limited only by the following claims, such as using the nut fastener 100 for any fastening application where it is desirable to prevent a user from loosening the 100 fastener. Furthermore, the inside of the nut body 10 can mate with the mating portion 20 using different internal attaching mechanisms, such as bayonet-type locking protrusions or locking tabs.

What is claimed is:

1. A valve, comprising:

a valve cap comprising a nut body with a through-hole therein including a side wall that is internally threaded and at least one lobe that extends from the side wall, wherein said at least one lobe has a flat portion that extends substantially radially away from the side wall; and a valve body comprising a valve stem and upstream and downstream valve portions, wherein the valve stem extends through the through hole.

2. The valve of claim 1, wherein the nut body is turned by applying a rotational force to at least one of the flat portions.

3. The valve of claim 1, wherein the at least one lobe has a curved portion that extends from the flat portion.

4. The valve of claim 1, wherein the at least one lobe is at least two lobes, and each lobe has a curved portion that extends from the flat portion to the flat portion to the flat portion of an adjacent lobe.

* * * * *